United States Patent
Delgoshaei et al.

(10) Patent No.: US 10,598,553 B2
(45) Date of Patent: Mar. 24, 2020

(54) METHOD AND APPARATUS FOR IDENTIFYING ERRONEOUS DISCHARGE AIR TEMPERATURE (DAT) SENSOR INSTALLATION

(71) Applicant: Lennox Industries Inc., Richardson, TX (US)

(72) Inventors: Payam Delgoshaei, Addison, TX (US); Sridhar Venkatesh, Irving, TX (US); Glenn W. Kowald, Carrollton, TX (US); Lars Noergaard Oernbo, Plano, TX (US)

(73) Assignee: Lennox Industries Inc., Richardson, TX (US)

( * ) Notice: Subject to any disclaimer, the term of this patent is extended or adjusted under 35 U.S.C. 154(b) by 262 days.

(21) Appl. No.: 15/708,724

(22) Filed: Sep. 19, 2017

(65) Prior Publication Data
US 2019/0086276 A1   Mar. 21, 2019

(51) Int. Cl.
*G01K 15/00* (2006.01)
*G01K 13/02* (2006.01)
(Continued)

(52) U.S. Cl.
CPC ............ *G01K 15/007* (2013.01); *F24F 11/30* (2018.01); *F24F 11/62* (2018.01); *G01K 3/14* (2013.01);
(Continued)

(58) Field of Classification Search
CPC ........ G01K 15/007; G01K 3/14; G01K 13/02; G01K 2013/024; F24F 11/62; F24F 11/30;
(Continued)

(56) References Cited

U.S. PATENT DOCUMENTS 4,347,712 A    9/1982  Benton et al.
6,385,510 B1 *  5/2002  Hoog .................. F24F 11/30
                                                   700/276
(Continued)

FOREIGN PATENT DOCUMENTS

KR    20080020845 A    3/2008

*Primary Examiner* — Lisa M Caputo
*Assistant Examiner* — Philip L Cotey
(74) *Attorney, Agent, or Firm* — Winstead PC (57) ABSTRACT

A method of monitoring a HVAC system to detect erroneous sensor installation. The method includes determining whether a circulation fan has been operational for a first predetermined time interval. If the circulation fan has been operational for the first predetermined time interval, determining whether a cooling demand is present. If the cooling demand is present, determining whether the HVAC system has been conditioning air for the first predetermined time interval responsive to the cooling demand. If the HVAC system has been conditioning the air for the first predetermined time interval, determining whether a difference between an indoor air temperature value corresponding to an enclosed space and an air temperature value from a discharge air temperature (DAT) sensor is greater than a predetermined temperature value. If the difference is not greater than the predetermined temperature value, forwarding a message indicating that the DAT sensor positioned within a duct of the HVAC system is improperly installed.

19 Claims, 3 Drawing Sheets

(51) Int. Cl.
*G01K 3/14* (2006.01)
*F24F 11/30* (2018.01)
*F24F 11/62* (2018.01)
*F24F 11/52* (2018.01)
*F24F 11/61* (2018.01)
*F24F 110/10* (2018.01)

(52) U.S. Cl.
CPC .............. *G01K 13/02* (2013.01); *F24F 11/52* (2018.01); *F24F 11/61* (2018.01); *F24F 2110/10* (2018.01); *F24F 2221/32* (2013.01); *G01K 2013/024* (2013.01)

(58) Field of Classification Search
CPC ........ F24F 2110/10; F24F 11/52; F24F 11/61; F24F 2221/32
See application file for complete search history.

(56) References Cited

U.S. PATENT DOCUMENTS

| | | | |
|---|---|---|---|
| 2003/0066897 A1 | 4/2003 | Carner et al. | |
| 2005/0125102 A1* | 6/2005 | Nichols | G05B 15/02 700/276 |
| 2007/0012052 A1* | 1/2007 | Butler | F25B 49/02 62/181 |
| 2013/0345883 A1 | 12/2013 | Sloo et al. | |
| 2015/0100167 A1* | 4/2015 | Sloo | G08B 17/117 700/278 |
| 2015/0345813 A1 | 12/2015 | Rite et al. | |
| 2017/0292725 A1* | 10/2017 | Conley | G05B 19/048 |

\* cited by examiner

METHOD AND APPARATUS FOR IDENTIFYING ERRONEOUS DISCHARGE AIR TEMPERATURE (DAT) SENSOR INSTALLATION

TECHNICAL FIELD

The present invention relates generally to heating, ventilation, and air conditioning (HVAC) systems and, more particularly, but not by way of limitation, to detecting improper installation of a discharge air temperature (DAT) sensor within the HVAC system.

HISTORY OF RELATED ART

HVAC systems are used to regulate environmental conditions within an enclosed space. Typically, HVAC systems have a circulation fan that pulls air from the enclosed space through ducts and pushes the air back into the enclosed space through additional ducts after conditioning the air (e.g., heating, cooling, humidifying, or dehumidifying the air).

SUMMARY OF THE INVENTION

A method of monitoring a heating, ventilation, and air conditioning (HVAC) system to detect erroneous sensor installation. The method includes monitoring, by a controller, operation of the HVAC system and determining, by the controller, whether a circulation fan has been operational for a first predetermined time interval. Responsive to a determination that the circulation fan has been operational for the first predetermined time interval, determining, by the controller, whether a cooling demand is present. Responsive to a determination that the cooling demand is present, determining, by the controller, whether the HVAC system has been conditioning air for the first predetermined time interval responsive to the cooling demand. Responsive to a determination that the HVAC system has been conditioning the air for the first predetermined time interval, determining, by the controller, whether a difference between an indoor air temperature value corresponding to an enclosed space and an air temperature value from a discharge air temperature (DAT) sensor is greater than a predetermined temperature value. Responsive to a determination that the difference is not greater than the predetermined temperature value, forwarding, by the HVAC system to a monitoring device associated with a service provider, a message indicating that the DAT sensor positioned within a duct of the HVAC system is improperly installed.

A heating, ventilation, and air conditioning (HVAC) system. The system includes a discharge air temperature (DAT) sensor positioned within a supply air duct of the HVAC system and a controller configured to monitor operation of the HVAC system. The controller is further configured to determine whether a circulation fan has been operational for a first predetermined time interval, responsive to a determination that the circulation fan has been operational for the first predetermined time interval, determine whether a cooling demand is present, responsive to a determination that the cooling demand is present, determine whether the HVAC system has been conditioning air for the first predetermined time interval responsive to the cooling demand, responsive to a determination that the HVAC system has been conditioning the air for the first predetermined time interval, determine whether a difference between an indoor air temperature value corresponding to an enclosed space and an air temperature value from the DAT sensor is greater than a predetermined temperature value, and responsive to a determination that the difference is not greater than the predetermined temperature value, forward to a monitoring device associated with a service provider, a message indicating that the DAT sensor is improperly installed.

A method of monitoring a heating, ventilation, and air conditioning (HVAC) system to detect erroneous sensor installation. The method includes monitoring, by a controller, operation of the HVAC system and determining, by the controller, whether a circulation fan has been operational for a first predetermined time interval. Responsive to a determination that the circulation fan has been operational for the first predetermined time interval, determining, by the controller, whether a cooling demand is present. Responsive to a determination that the cooling demand is present, determining, by the controller, whether the HVAC system has been conditioning air for the first predetermined time interval responsive to the cooling demand. Responsive to a determination that the HVAC system has been conditioning the air for the first predetermined time interval, determining, by the controller, whether a difference between an indoor air temperature value corresponding to an enclosed space and an air temperature value from a discharge air temperature (DAT) sensor is greater than a predetermined temperature value. Responsive to a determination that the difference is not greater than the predetermined temperature value, forwarding, by the HVAC system to a monitoring device associated with a service provider, a message indicating that the DAT sensor positioned within a supply air duct of the HVAC system is improperly installed. Responsive to a determination that the difference is greater than the predetermined temperature value, the HVAC system indicates that the DAT sensor is properly installed and wherein the first predetermined time interval comprises at least three minutes.

BRIEF DESCRIPTION OF THE DRAWINGS

A more complete understanding of embodiments of the present invention may be obtained by reference to the following Detailed Description when taken in conjunction with the accompanying Drawings wherein.

DETAILED DESCRIPTION OF ILLUSTRATIVE EMBODIMENTS

To direct operations of the circulation fan and other components, each HVAC system includes at least one controller. In addition to directing the operation of the HVAC system, the at least one controller may also be used to monitor various components, also referred to as equipment, of the HVAC system to determine if the HVAC system components are functioning appropriately. Thus, the at least one controller can detect an occurrence of a service event, generate a service alarm, and send a message to a user interface or a service provider. The service event may be, for example, a trigger of a service indicator, an expiration of a service event timer for a component of the HVAC system, improper installation of the DAT sensor, component malfunction, and the like.

Figure 1:
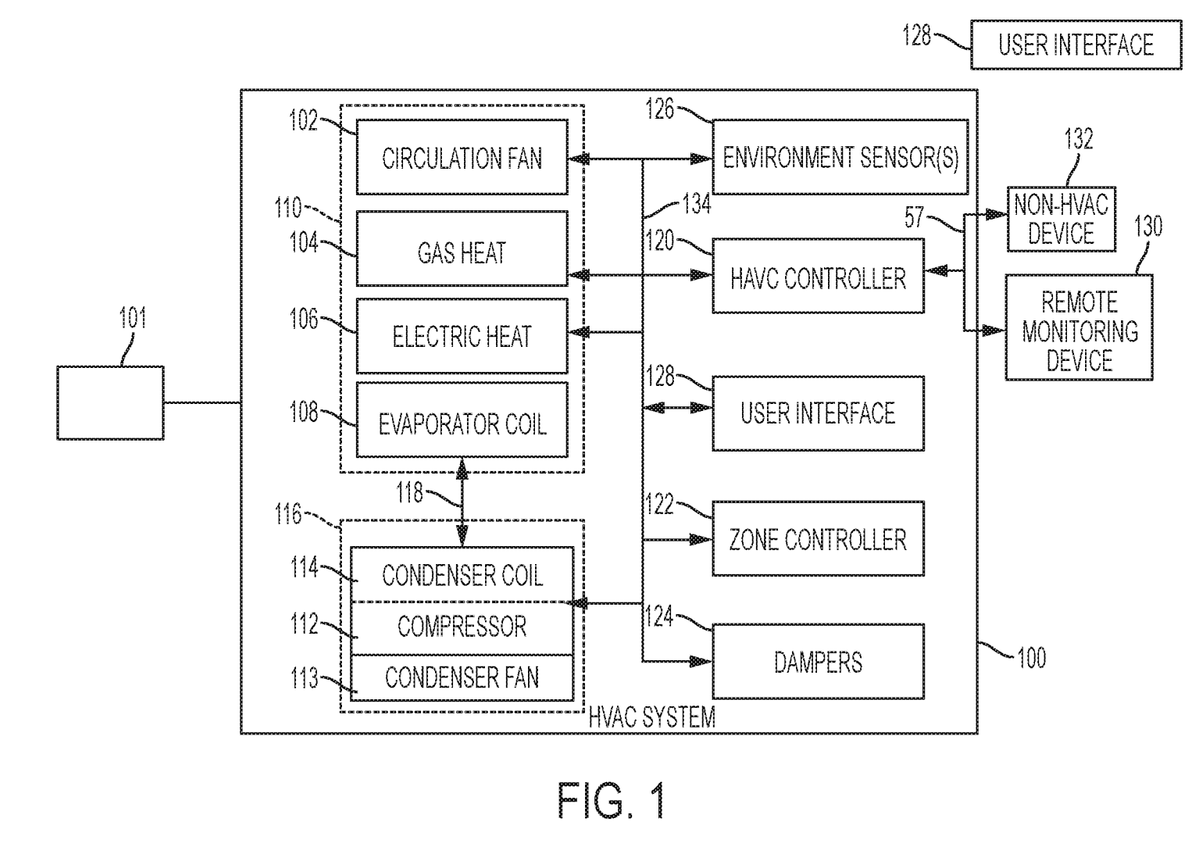
FIG. 1 is a block diagram of an illustrative HVAC system.

FIG. 1 illustrates an HVAC system 100. In a typical embodiment, the HVAC system 100 is a networked HVAC system configured to condition air via, for example, heating, cooling, humidifying, or dehumidifying. The HVAC system 100 can be a residential system or a commercial system such as, for example, a roof top system. For illustration, the HVAC system 100 as illustrated in FIG. 1 includes various components; however, in other embodiments, the HVAC system 100 may include additional components that are not illustrated but typically included within HVAC systems.

The HVAC system 100 includes a circulation fan 102, a gas heat section 104, electric heat section 106, and a refrigerant evaporator coil 108 all typically associated with the circulation fan 102. The circulation fan 102, the gas heat section 104, the electric heat section 106, and the refrigerant evaporator coil 108 are collectively referred to as an "indoor unit" 110. In a typical embodiment, the circulation fan 102 may be a multi-speed or variable-speed circulation fan and the gas heat section 104 may be one or more stages or modulating heat output. In a typical embodiment, the indoor unit 110 is located within, or in close proximity to, an enclosed space 101. The HVAC system 100 also includes a compressor 112, an associated condenser coil 114, and a condenser fan 113, which are typically referred to as an "outdoor unit" 116. In a typical embodiment, the condenser fan 113 may be at least one of a fixed-speed condenser fan, a multi-speed condenser fan, or a variable-speed condenser fan. In some embodiments, the HVAC system 100 includes a reversing valve (not illustrated) to allow operation in a compressor heating mode. In various embodiments, the outdoor unit 116 is, for example, a rooftop unit or a ground-level unit. The compressor 112 and the associated condenser coil 114 are connected to an associated evaporator coil 108 by a refrigerant line 118. In a typical embodiment, the compressor 112 is, for example, a single-stage compressor, a multi-stage compressor, or a variable-speed compressor. The circulation fan 102, sometimes referred to as a blower, is configured to operate at different capacities (i.e., variable motor speeds) to circulate air through the HVAC system 100, whereby the circulated air is conditioned and supplied to the enclosed space 101.

Still referring to FIG. 1, the HVAC system 100 includes an HVAC controller 120 that is configured to control operation of the various components of the HVAC system 100 such as, for example, the circulation fan 102, the gas heat section 104, the electric heat section 106, the compressor 112, and the condenser fan 113. In some embodiments, the HVAC system 100 can be a zoned system. In such embodiments, the HVAC system 100 includes a zone controller 122, dampers 124, and a plurality of environment sensors 126. The plurality of environment sensors 126 may be, for example, outside air temperature (OAT) sensors that are configured to measure outdoor air temperature, DAT sensors that are configured to measure HVAC air-duct discharge air temperature, indoor air temperature (IAT) sensors (e.g., room temperature sensors), and the like. In a typical embodiment, the HVAC controller 120 cooperates with the zone controller 122 and the dampers 124 to regulate the environment of the enclosed space 101.

The HVAC controller 120 may be an integrated controller or a distributed controller that directs operation of the HVAC system 100. In a typical embodiment, the HVAC controller 120 includes an interface to receive, for example, thermostat demands, component health data, temperature setpoints, blower control signals, environmental conditions, and operating mode status for various zones of the HVAC system 100. In a typical embodiment, the HVAC controller 120 also includes a processor and a memory to direct operation of the HVAC system 100 including, for example, a speed of the circulation fan 102.

Still referring to FIG. 1, in some embodiments, the plurality of environment sensors 126 are associated with the HVAC controller 120 and also optionally associated with a user interface 128. In some embodiments, the user interface 128 provides additional functions such as, for example, operational, diagnostic, status message display, and a visual interface that allows at least one of an installer, a user, a support entity, and a service provider to perform actions with respect to the HVAC system 100, in some embodiments, the user interface 128 is, for example, a thermostat of the HVAC system 100. In other embodiments, the user interface 128 is associated with at least one sensor of the plurality of environment sensors 126 to determine the environmental condition information and communicate that information to the user. The user interface 128 may also include a display, buttons, a microphone, a speaker, or other components to communicate with the user. Additionally, the user interface 128 may include a processor and memory that is configured to receive user-determined parameters, and calculate operational parameters of the HVAC system 100 as disclosed herein.

In a typical embodiment, the HVAC system 100 is configured to communicate with a plurality of devices such as, for example, a monitoring device 130, a communication device 132, and the like. In a typical embodiment, the monitoring device 130 is not part of the HVAC system. For example, the monitoring device 130 is a server or computer of a third party such as, for example, a manufacturer, a support entity, a service provider, and the like. In other embodiments, the monitoring device 130 is located at an office of, for example, the manufacturer, the support entity, the service provider, and the like.

In a typical embodiment, the communication device 132 is a non-HVAC device having a primary function that is not associated with HVAC systems. For example, non-HVAC devices include mobile-computing devices that are configured to interact with the HVAC system 100 to monitor and modify at least some of the operating parameters of the HVAC system 100. Mobile computimg devices may be, for example, a personal computer (e.g., desktop or laptop), a tablet computer, a mobile device (e.g., smart phone), and the like. In a typical embodiment, the communication device 132 includes at least one processor, memory and a user interface, such as a display. One skilled in the art will also understand that the communication device 132 disclosed herein includes other components that are typically included in such devices including, for example, a power supply, a communications interface, and the like.

The zone controller 122 is configured to manage movement of conditioned air to designated zones of the enclosed space. The zone-controlled HVAC system 100 allows the user to independently control the temperature in the designated zones. In a typical embodiment, the zone controller 122 operates the dampers 124 to control air flow to the zones of the enclosed space.

In some embodiments, a data bus 134, which in the illustrated embodiment is a serial bus, couples various components of the HVAC; system 100 together such that data is communicated therebetween. In a typical embodiment, the data bus 134 may include, for example, any combination of hardware, software embedded in a computer readable medium, or encoded logic incorporated in hardware or otherwise stored (e.g., firmware) to couple components of the HVAC system 100 to each other. As an example and not by way of limitation, the data bus 134 may include an Accelerated Graphics Port (AGP) or other graphics bus, a Controller Area Network (CAN) bus, a front-side bus (FSB), a HYPERTRANSPORT (HT) interconnect, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. In various embodiments, the data bus 134 may include any number, type, or configuration of data buses 134, where appropriate. In particular embodiments, one or more data buses 134 (which may each include an address bus and a data bus) may couple the HVAC controller 120 to other components of the HVAC system 100. In other embodiments, connections between various components of the HVAC system 100 are wired. For example, conventional cable and contacts may be used to couple the HVAC controller 120 to the various components. In some embodiments, a wireless connection is employed to provide at least some of the connections between components of the HVAC system such as, for example, a connection between the HVAC controller 120 and the circulation fan 102 or the plurality of environment sensors 126.

Figure 2:
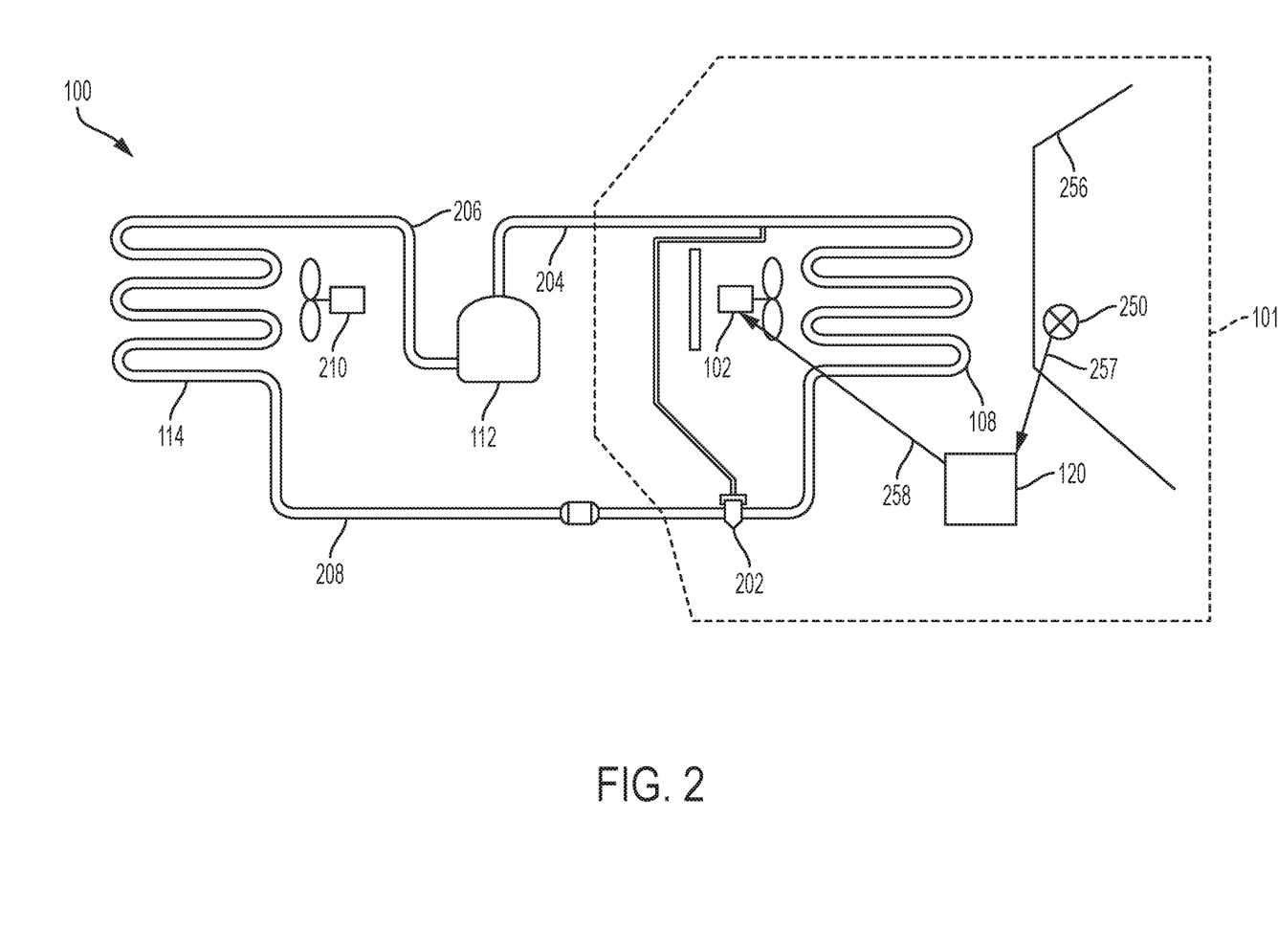
FIG. 2 is a schematic diagram of the exemplary HVAC system of FIG. 1.

FIG. 2 is a schematic diagram of the exemplary HVAC system 100. For illustrative purposes, FIG. 2 will be described herein relative to FIG. 1. The HVAC system 100 includes the refrigerant evaporator coil 108, the condenser coil 114, the compressor 112, and a metering device 202. In a typical embodiment, the metering device 202 is, for example, a thermostatic expansion valve or a throttling valve. The refrigerant evaporator coil 108 is fluidly coupled to the compressor 112 via a suction line 204. The compressor 112 is fluidly coupled to the condenser coil 114 via a discharge line 206. The condenser coil 114 is fluidly coupled to the metering device 202 via a liquid line 208.

The HVAC system 100 further includes a discharge air temperature (DAT) sensor 250 that is disposed in a duct 256. In a typical embodiment, the duct 256 may be, for example, a discharge air duct. The DAT sensor 250 is, for example, a thermistor; however, in other embodiments, the DAT sensor 250 may be a thermocouple, a thermometer, or other appropriate device as dictated by design requirements. The DAT sensor 250 is configured to measure temperature of air moving through the duct 256. The DAT sensor 250 is configured to transmit a signal to the HVAC controller 120 corresponding to air temperature values in the duct 256. The signal transmitted by the DAT sensor 250 is illustrated by arrows 257.

The HVAC controller 120 is further configured to receive a signal from at least one sensor of the plurality of environment sensors 126 corresponding to temperature values within the enclosed space 101 such as, for example, a room. The DAT sensor 250 and the plurality of environment sensors 126 may communicate with the HVAC controller 120 via, for example, a wired connection or a wireless connection. Improper placement of the DAT sensor 250 in the duct 256 or an improper connection of the DAT sensor 250 with the HVAC controller 120 results in operational problems relative to heating and cooling of the HVAC system 100. In a typical embodiment, the HVAC controller 120 performs a comparison between the air temperature value in the duct 256 received from the DAT sensor 250 and the indoor air temperature values corresponding to the enclosed space 101 to determine whether the DAT sensor 250 has been properly installed. In some embodiments, the HVAC controller 120 is configured to determine installation issues relative to the plurality of environment sensors 126.

Figure 3:
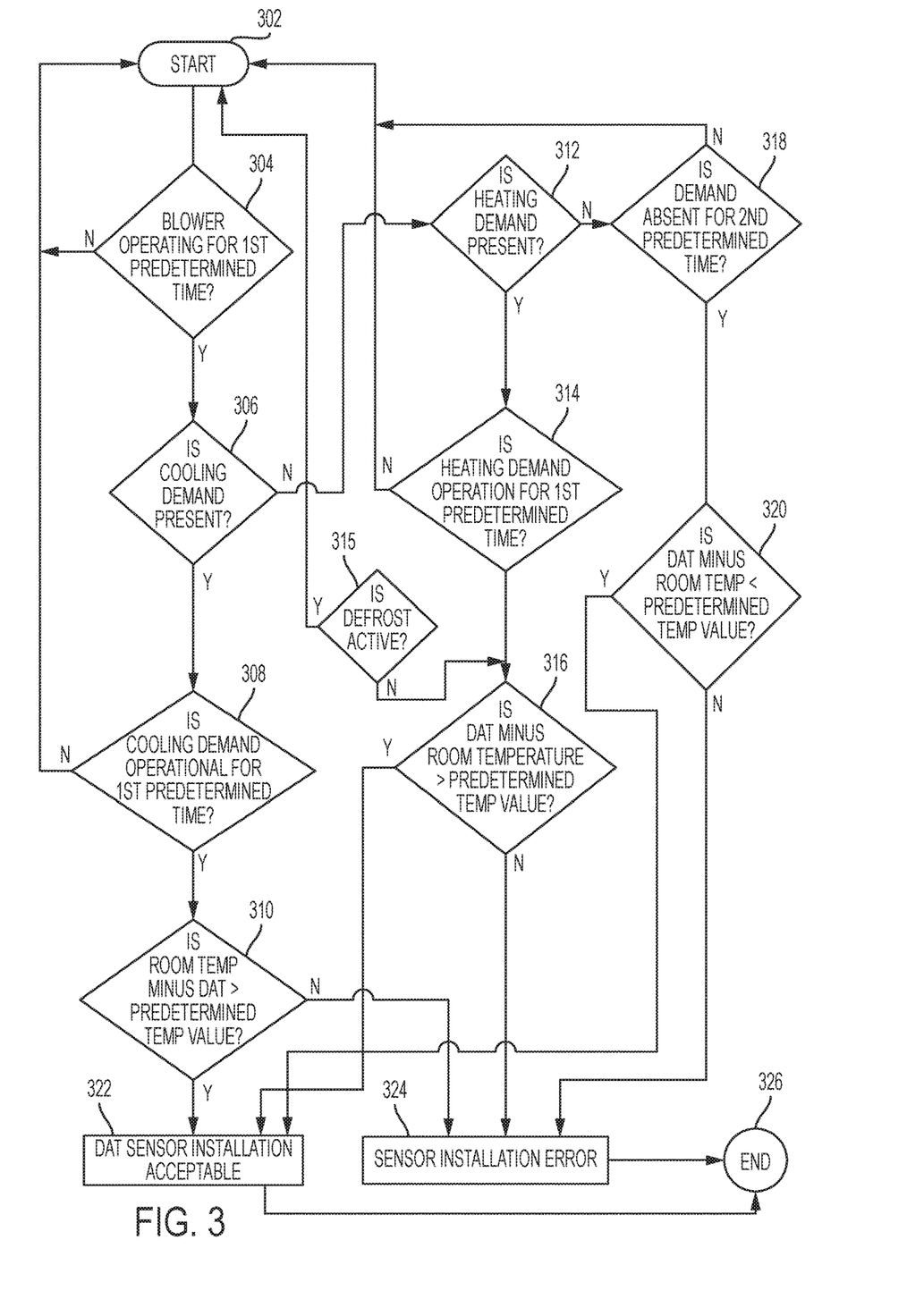
FIG. 3 is a flow chart illustrating an exemplary process to detect erroneous DAT sensor installation.

FIG. 3 is a flow chart illustrating an exemplary process 300 to detect erroneous DAT sensor installation. For illustrative purposes, the process 300 will be described herein relative to FIGS. 1-2. The process 300 begins at step 302. At step 304, it is determined whether the circulation fan 102 has been operational for a first predetermined time interval. In a typical embodiment, the first predetermined time interval may be, for example, at least three minutes. If it is determined at step 304 that the circulation fan 102 has not been operational for the first predetermined time interval, the process 300 returns to step 302. However, if it is determined at step 304 that the circulation fan 102 has been operational for the first predetermined time interval, the process 300 proceeds to step 306. At step 306, it is determined whether a cooling demand is present. In a typical embodiment, the cooling demand may be indicated via a signal sent from the thermostat to the HVAC controller 120 to condition air via, for example, cooling to reach a temperature setpoint.

If it is determined at step 306 that cooling demand is not present, the process 300 proceeds to step 312. However, if it is determined at step 306 that cooling demand is present, the process 300 proceeds to step 308. At step 308, it is determined whether the HVAC system 100 has been conditioning the air for at least three minutes responsive to the cooling demand. If it is determined at step 308 that the HVAC system 100 has not been conditioning the air for at least three minutes responsive to the cooling demand, the process 300 returns to step 302. However, if it is determined at step 308 that the HVAC system 100 has been conditioning the air for at least three minutes responsive to the cooling demand, the process 300 proceeds to step 310.

At step 310, it is determined whether a difference between the indoor air temperature value corresponding to the enclosed space 101 and the air temperature value from the DAT sensor 250 is greater than a predetermined temperature value. In a typical embodiment, the predetermined temperature value may be, for example, approximately 10° F. In a typical embodiment, the HVAC controller 120 performs a comparison between the indoor air temperature value corresponding to the enclosed space 101 and the air temperature value from the DAT sensor 250 to calculate the difference. If it is determined at step 310 that the difference is greater than the predetermined temperature value, the process proceeds to step 322. At step 322, it is indicated that the DAT sensor is properly installed. However, if it is determined at step 310 that the difference is less than the predetermined temperature value, the process proceeds to step 324. Step 324 indicates that at least one of the DAT sensor 250 and the room temperature sensor is improperly installed and a message is communicated by the HVAC system 100 to the monitoring device 130 associated with the service provider.

At step 312, it is determined whether a heating demand is present. In a typical embodiment, the heating demand (serviced by a gas or compressor heat) may be indicated via a signal sent from the thermostat to the HVAC controller 120 to condition air via, for example, heating to reach the temperature setpoint. If it is determined at step 312 that heating demand is not present, the process 300 proceeds to step 318. However, if it is determined at step 312 that heating demand is present, the process 300 proceeds to step 314. At step 314, it is determined whether the HVAC system 100 has been conditioning the air for at least three minutes responsive to the heating demand. If it is determined at step 314 that the HVAC system 100 has not been conditioning the air for at least three minutes responsive to the heating demand, the process 300 returns to step 302. However, if it is determined at step 314 that the HVAC system 100 has been conditioning the air for at least three minutes responsive to the heating demand, the process 300 proceeds to step 315. At step 315, it is determined whether a defrost cycle required for compressor heating is active. If it is determined at step 315 that the defrost cycle is active, the process 300 returns to step 302. However, if it is determined at step 315 that the defrost cycle is inactive, the process 300 proceeds to step 316.

At step 316, it is determined whether a difference between the air temperature value in the duct from the DAT sensor 250 and the indoor air temperature value corresponding to the enclosed space 101 is greater than the predetermined temperature value. If it is determined at step 316 that the difference is greater than the predetermined temperature value, the process proceeds to step 322. At step 322, it is indicated that the DAT sensor is properly installed. However, if it is determined at step 316 that the difference is not greater than the predetermined temperature value, the process proceeds to step 324. Step 324 indicates that at least one of the DAT sensor 250 and the room temperature sensor is improperly installed and a message is communicated by the HVAC system 100 to the monitoring device 130 associated with the service provider.

At step 318, it is determined whether the cooling demand or the heating demand has been absent for a second predetermined time interval. In a typical embodiment, the second predetermined time interval may be, for example, at least ten minutes. If it is determined at step 318 that either the cooling demand or the heating demand has not been absent for the second predetermined time interval, the process 300 returns to step 302. However, if it is determined at step 318 that either the cooling demand or the heating demand has been absent for the second predetermined time interval, the process 300 proceeds to step 320.

At step 320, it is determined whether a difference between the air temperature value in the duct from the DAT sensor 250 and the indoor air temperature value corresponding to the enclosed space 101 is less than the predetermined temperature value. If it is determined at step 316 that the difference is less than the predetermined temperature value, the process proceeds to step 322. At step 322, it is indicated that the DAT sensor is properly installed. However, if it is determined at step 316 that the difference is greater than or equal to the predetermined temperature value, the process proceeds to step 324. Step 324 indicates that at least one of the DAT sensor 250 and the room temperature sensor is improperly installed and a message is communicated by the HVAC system 100 to the monitoring device 130 associated with the service provider. From steps 322 and 324, the process 300 ends at step 326.

For purposes of this patent application, the term computer-readable storage medium encompasses one or more tangible computer-readable storage media possessing structures. As an example and not by way of limitation, a computer-readable storage medium may include a semiconductor-based or other integrated circuit (IC) (such as, for example, a field-programmable gate array (FPGA) or an application-specific IC (ASIC)), a hard disk, an HDD, a hybrid hard drive (MD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of the processor, one or more portions of the system memory, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

In this patent application, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Python, Java, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

Although various embodiments of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method of monitoring a heating, ventilation, and air conditioning (HVAC) system to detect erroneous sensor installation, the method comprising:
   monitoring, by a controller, operation of the HVAC system;
   determining, by the controller, whether a circulation fan has been operational for a first predetermined time interval;
   responsive to a determination that the circulation fan has been operational for the first predetermined time interval, determining, by the controller, whether a cooling demand is present;
   responsive to a determination that the cooling demand is present, determining, by the controller, whether the HVAC system has been conditioning air for the first predetermined time interval responsive to the cooling demand;
   responsive to a determination that the HVAC system has been conditioning the air for the first predetermined time interval, determining, by the controller, whether a difference between an indoor air temperature value corresponding to an enclosed space and an air temperature value from a discharge air temperature (DAT) sensor is greater than a predetermined temperature value;
   responsive to a determination that the difference is not greater than the predetermined temperature value, forwarding, by the HVAC system to a monitoring device associated with a service provider, a message indicating that the DAT sensor positioned within a duct of the HVAC system is improperly installed;
   responsive to a determination that the circulation fan has not been operational for the first predetermined time interval, returning to the monitoring step; and
   wherein the first predetermined time interval comprises at least three minutes.

2. The method of claim 1, further comprising:
   responsive to a determination that the HVAC system has not been conditioning the air for the first predetermined time interval responsive to the cooling demand, returning to the monitoring step; and
   wherein the first predetermined time interval comprises at least three minutes.

3. The method of claim 1, further comprising:
   responsive to a determination that the difference is greater than the predetermined temperature value, the HVAC system indicates that the DAT sensor is properly installed; and
   wherein the predetermined temperature value comprises approximately 10° F.

4. The method of claim 1, further comprising:
   responsive to a determination that the cooling demand is not present, determining, by the controller, whether a heating demand is present;
   responsive to a determination that the heating demand is present, determining, by the controller, whether the HVAC system has been conditioning air for the first predetermined time interval responsive to the heating demand;
   responsive to a determination that the HVAC system has been conditioning the air for the first predetermined time interval, determining, by the controller, whether a difference between the air temperature value from the DAT sensor and the indoor air temperature value corresponding to the enclosed space is greater than the predetermined temperature value;
   responsive to a determination that the difference between the air temperature value from the DAT sensor and the indoor air temperature value corresponding to the enclosed space is not greater than the predetermined temperature value, forwarding, by the HVAC system to the monitoring device associated with the service provider, the message indicating that the DAT sensor is improperly installed; and
   wherein the first predetermined time interval comprises at least three minutes.

5. The method of claim 4, further comprising:
   responsive to a determination that the difference between the air temperature value from the DAT sensor and the indoor air temperature value corresponding to the enclosed space is greater than the predetermined temperature value, the HVAC system indicates that the DAT sensor is properly installed; and
   wherein the predetermined temperature value comprises approximately 10° F.

6. The method of claim 4, further comprising:
   responsive to a determination that the HVAC system has not been conditioning the air for the first predetermined time interval responsive to the heating demand, returning to the monitoring step.

7. The method of claim 4, further comprising:
   responsive to a determination that the heating demand is not present, determining, by the controller, whether the HVAC system has not been conditioning air for a second predetermined time interval responsive to the heating demand and the cooling demand;
   responsive to a determination that the HVAC system has been conditioning the air for the second predetermined time interval responsive to the heating demand and the cooling demand, returning to the monitoring step; and
   wherein the second predetermined time interval comprises at least ten minutes.

8. The method of claim 7, further comprising:
   responsive to a determination that the HVAC system has not been conditioning the air for the second predetermined time interval responsive to the heating demand and the cooling demand, determining, by the controller, whether the difference between the air temperature value from the DAT sensor and the indoor air temperature value corresponding to the enclosed space is less than the predetermined temperature value; and responsive to a determination that the difference between the air temperature value from the DAT sensor and the indoor air temperature value corresponding to the enclosed space is not less than the predetermined temperature value, forwarding, by the HVAC system to the monitoring device associated with the service provider, the message indicating that the DAT sensor is improperly installed.

9. The method of claim 7, further comprising:
responsive to a determination that the difference between the air temperature value from the DAT sensor and the indoor air temperature value corresponding to the enclosed space is less than the predetermined temperature value, the HVAC system indicates that the DAT sensor is properly installed; and
wherein the predetermined temperature value comprises approximately 10° F.

10. The method of claim 1, wherein the DAT sensor is configured to measure temperature of air moving through the supply air duct.

11. The method of claim 1, wherein the DAT sensor comprises at least one of a thermistor, a thermocouple, and a thermometer.

12. A heating, ventilation, and air conditioning (HVAC) system comprising:
a discharge air temperature (DAT) sensor positioned within a supply air duct of the HVAC system;
a controller configured to monitor operation of the HVAC system;
wherein the controller is further configured to:
determine whether a circulation fan has been operational for a first predetermined time interval;
responsive to a determination that the circulation fan has been operational for the first predetermined time interval, determine whether a cooling demand is present;
responsive to a determination that the cooling demand is present, determine whether the HVAC system has been conditioning air for the first predetermined time interval responsive to the cooling demand;
responsive to a determination that the HVAC system has been conditioning the air for the first predetermined time interval, determine whether a difference between an indoor air temperature value corresponding to an enclosed space and an air temperature value from the DAT sensor is greater than a predetermined temperature value;
responsive to a determination that the difference is not greater than the predetermined temperature value, forward to a monitoring device associated with a service provider, a message indicating that the DAT sensor is improperly installed;
responsive to a determination that the circulation fan has not been operational for the first predetermined time interval, returning to the monitoring step; and
wherein the first predetermined time interval comprises at least three minutes.

13. The HVAC system of claim 12, wherein the controller is further configured to:
responsive to a determination that the cooling demand is not present, determine whether a heating demand is present;
responsive to a determination that the heating demand is present, determine whether the HVAC system has been conditioning air for the first predetermined time interval responsive to the heating demand;
responsive to a determination that the HVAC system has been conditioning the air for the first predetermined time interval, determine whether a difference between the air temperature value from the DAT sensor and the indoor air temperature value corresponding to the enclosed space is greater than the predetermined temperature value;
responsive to a determination that the difference between the air temperature value from the DAT sensor and the indoor air temperature value corresponding to the enclosed space is not greater than the predetermined temperature value, forward, to the monitoring device associated with the service provider, the message indicating that the DAT sensor is improperly installed;
wherein the first predetermined time interval comprises at least three minutes; and
wherein the predetermined temperature value comprises approximately 10° F.

14. The HVAC system of claim 13, further comprising:
responsive to a determination that the difference between the air temperature value from the DAT sensor and the indoor air temperature value corresponding to the enclosed space is greater than the predetermined temperature value, the HVAC system indicates that the DAT sensor is properly installed.

15. The HVAC system of claim 13, wherein the controller is further configured to:
responsive to a determination that the heating demand is not present, determine whether the HVAC system has not been conditioning air for a second predetermined time interval responsive to the heating demand and the cooling demand;
responsive to a determination that the HVAC system has not been conditioning the air for the second predetermined time interval responsive to the heating demand and the cooling demand, determine whether the difference between the air temperature value from the DAT sensor and the indoor air temperature value corresponding to the enclosed space is less than the predetermined temperature;
responsive to a determination that the difference between the air temperature value from the DAT sensor and the indoor air temperature value corresponding to the enclosed space is not less than the predetermined temperature value, forward, to the monitoring device associated with the service provider, the message indicating that the DAT sensor is improperly installed; and
wherein the second predetermined time interval comprises at least ten minutes.

16. The HVAC system of claim 12, wherein the DAT sensor is configured to measure temperature of air moving through the supply air duct.

17. The HVAC system of claim 12, wherein the DAT sensor comprises at least one of a thermistor, a thermocouple, and a thermometer.

18. A method of monitoring a heating, ventilation, and air conditioning (HVAC) system to detect erroneous sensor installation, the method comprising:
monitoring, by a controller, operation of the HVAC system;
determining, by the controller, whether a circulation fan has been operational for a first predetermined time interval;
responsive to a determination that the circulation fan has been operational for the first predetermined time interval, determining, by the controller, whether a cooling demand is present;

responsive to a determination that the cooling demand is present, determining, by the controller, whether the HVAC system has been conditioning air for the first predetermined time interval responsive to the cooling demand;

responsive to a determination that the HVAC system has not been conditioning the air for the first predetermined time interval responsive to the cooling demand, returning to the monitoring step;

responsive to a determination that the HVAC system has been conditioning the air for the first predetermined time interval, determining, by the controller, whether a difference between an indoor air temperature value corresponding to an enclosed space and an air temperature value from a discharge air temperature (DAT) sensor is greater than a predetermined temperature value;

responsive to a determination that the difference is not greater than the predetermined temperature value, forwarding, by the HVAC system to a monitoring device associated with a service provider, a message indicating that the DAT sensor positioned within a supply air duct of the HVAC system is improperly installed;

responsive to a determination that the difference is greater than the predetermined temperature value, the HVAC system indicates that the DAT sensor is properly installed; and wherein the first predetermined time interval comprises at least three minutes.

19. The method of claim 18, wherein the predetermined temperature value comprises approximately 10° F.

* * * * *

UNITED STATES PATENT AND TRADEMARK OFFICE
CERTIFICATE OF CORRECTION

PATENT NO. : 10,598,553 B2
APPLICATION NO. : 15/708724
DATED : March 24, 2020
INVENTOR(S) : Payam Delgoshaei et al.

Page 1 of 1

It is certified that error appears in the above-identified patent and that said Letters Patent is hereby corrected as shown below:

In the Specification

| | |
|---|---|
| Column 4, Line 12 | Replace "respect to the HVAC system 100, in some embodiments," with -- respect to the HVAC system. In some embodiments, -- |
| Column 4, Line 42 | Replace "Mobile computimg devices may be, for" with -- Mobile computing devices may be, for -- |
| Column 7, Line 62 | Replace "hybrid hard drive (MD), an optical disc," with -- hybrid hard drive (HHD), an optical disc, -- |

Signed and Sealed this
Ninth Day of June, 2020

Andrei Iancu
*Director of the United States Patent and Trademark Office*